United States Patent
Shiratori et al.

(10) Patent No.: US 10,099,634 B2
(45) Date of Patent: Oct. 16, 2018

(54) WIRE HARNESS

(71) Applicant: Yazaki Corporation, Tokyo (JP)

(72) Inventors: Tatsuya Shiratori, Shizuoka (JP); Masahiro Ito, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/635,335

(22) Filed: Jun. 28, 2017

(65) Prior Publication Data
US 2018/0001847 A1    Jan. 4, 2018

(30) Foreign Application Priority Data
Jun. 29, 2016 (JP) ................. 2016-128706

(51) Int. Cl.
    *B60R 16/02* (2006.01)
    *B60R 16/023* (2006.01)
    *B60R 16/03* (2006.01)
    *H01B 9/00* (2006.01)

(52) U.S. Cl.
    CPC ........ *B60R 16/0207* (2013.01); *B60R 16/023* (2013.01); *B60R 16/03* (2013.01); *H01B 9/003* (2013.01)

(58) Field of Classification Search
    USPC ....................................... 301/10.1
    See application file for complete search history.

(56) References Cited

U.S. PATENT DOCUMENTS

| | | | | |
|---|---|---|---|---|
| 5,066,919 A | * | 11/1991 | Klassen | G01R 31/006 324/503 |
| 5,324,203 A | * | 6/1994 | Sano | B60K 37/00 174/72 A |
| 5,535,788 A | * | 7/1996 | Mori | H01B 13/01209 140/92.1 |
| 5,610,447 A | * | 3/1997 | Nishikawa | B60R 16/0207 174/72 A |
| 5,798,012 A | * | 8/1998 | Krane | B60R 16/0215 156/290 |

(Continued)

FOREIGN PATENT DOCUMENTS

JP  9-254721 A  9/1997
JP  11027825 A  1/1999

(Continued)

OTHER PUBLICATIONS

Communication dated Aug. 7, 2018 from the Japanese Patent Office in counterpart Japanese application No. 2016-128706.

*Primary Examiner* — William H Mayo, III
*Assistant Examiner* — Krystal Robinson
(74) *Attorney, Agent, or Firm* — Sughrue Mion, PLLC (57) ABSTRACT

A wire harness includes a linear trunk line section formed by bundling a plurality of power supply lines serving as linear wiring bodies wired in a vehicle and a pair of trunk line end distributors each of which is connected to a corresponding one of both ends of the linear trunk line section and distributes electric power from a power supply mounted on the vehicle to each connected appliance, the power supply being connected to at least one end of each of the trunk line end distributors. Thus, with the wire harness, a wiring path can be simplified by combining the linear trunk line section and the pair of trunk line end distributors.

18 Claims, 5 Drawing Sheets

(56) References Cited

U.S. PATENT DOCUMENTS

| | | | | |
|---|---|---|---|---|
| 5,818,673 A | * | 10/1998 | Matsumaru | H02J 1/06 |
| | | | | 361/63 |
| 5,912,511 A | | 6/1999 | Hidaka | |
| 6,182,807 B1 | * | 2/2001 | Saito | B60G 17/0185 |
| | | | | 191/2 |
| 6,528,899 B1 | * | 3/2003 | Saito | H02J 1/14 |
| | | | | 307/10.1 |
| 2004/0074665 A1 | * | 4/2004 | Sugaya | H01R 23/661 |
| | | | | 174/72 A |
| 2005/0150680 A1 | * | 7/2005 | Sugihara | G06F 17/509 |
| | | | | 174/128.1 |
| 2015/0349471 A1 | * | 12/2015 | Maki | H01R 13/6691 |
| | | | | 307/10.1 |

FOREIGN PATENT DOCUMENTS

| | | |
|---|---|---|
| JP | 2009214631 A | 9/2009 |
| JP | 2016110811 A | 6/2016 |

* cited by examiner

WIRE HARNESS

CROSS-REFERENCE TO RELATED APPLICATION (S)

The present application claims priority to and incorporates by reference the entire contents of Japanese Patent Application No. 2016-128706 filed in Japan on Jun. 29, 2016.

BACKGROUND OF THE INVENTION

1. Field of the Invention

The present invention relates to a wire harness.

2. Description of the Related Art

As a conventional wire harness applied to a vehicle, for example, Japanese Patent Application Laid-open No. H09-254721 discloses a wire harness for automobiles that can be used in common for four types of vehicles including a right-hand drive vehicle, a left-hand drive vehicle, a sedan-type vehicle, and a van-type vehicle. In the wire harness for automobiles, a front harness and an integrated harness of a floor harness and a rear harness are wired along the same path as a common harness for the four types of vehicles, and an integrated harness of a cowl harness and an instrument harness is configured to be different between the right-hand drive vehicle and the left-hand drive vehicle, and a connection part between the front harness and the integrated harness of the floor harness and the rear harness is arranged on the same side of either the left side or the right side.

However, there is room that the wire harness for automobiles disclosed in Japanese Patent Application Laid-open No. H09-254721 can be further improved in simplification of wiring path.

SUMMARY OF THE INVENTION

The present invention is made in view of such a situation, and an object thereof is to provide a wire harness that can simplify a wiring path.

In order to achieve the above mentioned object, a wire harness according to one aspect of the present invention includes a linear trunk line section formed by bundling a plurality of power supply lines as linear wiring bodies wired in a vehicle, and a pair of trunk line end distributors each of which is connected to a corresponding one of both ends of the linear trunk line section and distributes electric power from a power supply mounted on the vehicle to each connected appliance, the power supply being connected to at least one end of each of the trunk line end distributors.

According to another aspect of the present invention, in the wire harness, the linear trunk line section may include a communication line for signal communication serving as a linear wiring body bundled with the power supply lines and wired in the vehicle.

According to still another aspect of the present invention, the wire harness further may include a communication line for signal communication serving as a linear wiring body wired in the vehicle separately from the linear trunk line section, wherein the linear trunk line section is wired on one side of a metal flooring material of the vehicle with respect to a vertical direction, and the communication line is wired on another side of the flooring material with respect to the vertical direction.

According to still another aspect of the present invention, in the wire harness, the power supply lines may include a power line for power supply and a ground line for grounding.

According to still another aspect of the present invention, in the wire harness, the trunk line end distributors may include a fastened and grounded part that is fastened to the vehicle and grounded.

According to still another aspect of the present invention, in the wire harness, the trunk line end distributors may include a plurality of divided bodies that are able to be coupled to each other via a coupling unit and are able to be divided from each other via the coupling unit.

The above and other objects, features, advantages and technical and industrial significance of the present invention will be better understood by reading the following detailed description of presently preferred embodiments of the present invention, when considered in connection with the accompanying drawings.

DETAILED DESCRIPTION OF THE PREFERRED EMBODIMENTS

The following describes embodiments of the present invention in detail with reference to the drawings. The present invention is not limited to the embodiments. Components in the following embodiments include components that can be easily replaced by those skilled in the art, or are substantially the same as the components in the embodiments.

First Embodiment

Figure 1:
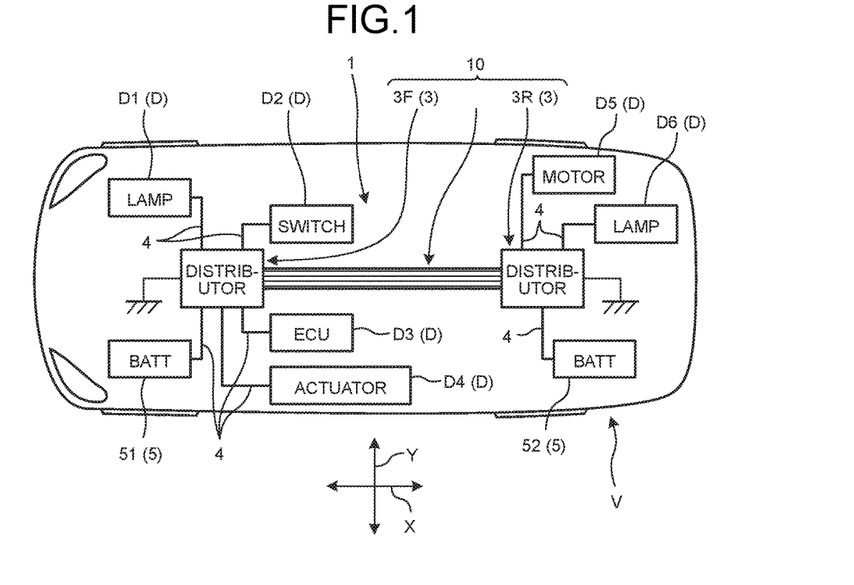
FIG. 1 is a schematic block diagram illustrating a schematic configuration of a vehicle to which a wire harness according to a first embodiment is applied.
Figure 2:
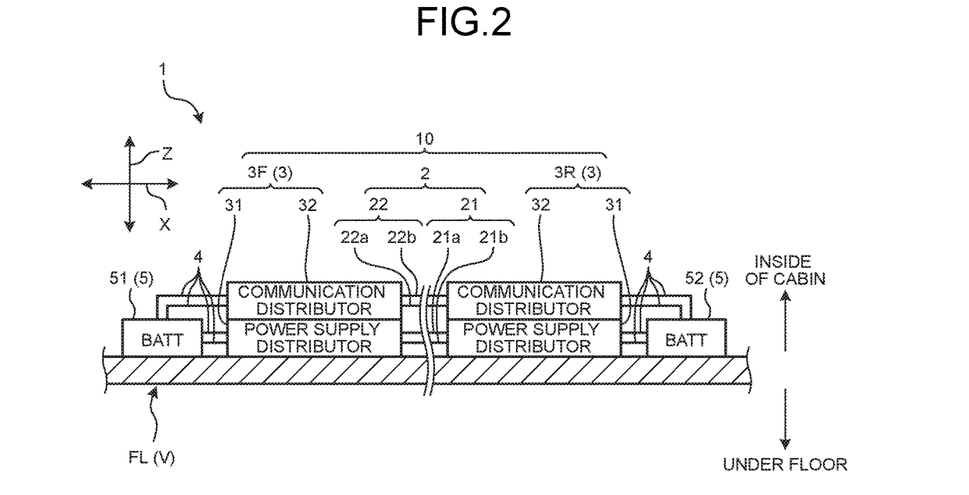
FIG. 2 is a schematic block diagram illustrating a schematic configuration of the wire harness according to the first embodiment.
Figure 3:
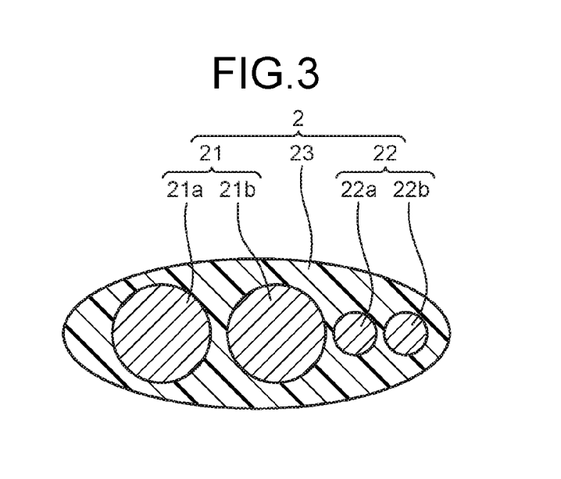
FIG. 3 is a schematic cross-sectional view illustrating a schematic configuration of a linear trunk line section of the wire harness according to the first embodiment.

A wire harness 1 according to the present embodiment illustrated in FIGS. 1, 2, and 3 is a wire harness module that is applied to a vehicle V, connects devices mounted on the vehicle V with each other, and is used for power supply and signal communication. The wire harness 1 is a structural electric module in which a linear trunk line section 2 is wired along a vehicle longitudinal direction X of the vehicle V, and supplies electric power to various appliances D mounted on the vehicle V via distributors 3 connected to the linear trunk line section 2. In the wire harness 1 according to the present embodiment, the linear trunk line section 2 and the distributors 3 constitute a common trunk line 10, middle wiring bodies 4 are wired to be spread around the distributors 3 constituting the common trunk line 10, and the distributors 3 are connected to the appliances D to simplify a wiring path. In the wire harness 1 according to the present embodiment, typically, the common trunk line 10 is made standardized and common as much as possible irrespective of the type of a vehicle, platform, vehicle grade, and the like to which the common trunk line 10 is applied, and each of the middle wiring bodies 4 and the like connecting the distributors 3 with the appliances D are made variable in accordance with the type of a vehicle, platform, vehicle grade, and the like. Accordingly, the wiring path can be simplified as described above, versatility can be improved due to standardized and common members, and optimization can be achieved due to selection diversity of members in a good balance. The following describes the configuration of the wire harness 1 in detail with reference to the drawings.

Here, the vehicle V to which the wire harness 1 is applied, the "vehicle longitudinal direction X" typically corresponds to the entire length direction of the vehicle V, that is, corresponds to a direction along a front-rear straight advancing direction of the vehicle V. The "vehicle width direction Y" typically corresponds to the entire width direction of the vehicle V, and corresponds to a vehicle horizontal direction of the vehicle V. The "vehicle height direction Z" typically corresponds to a vehicle height direction of the vehicle V. The vehicle longitudinal direction X as a first direction, the vehicle width direction Y as a second direction, and the vehicle height direction Z as a third direction are orthogonal to each other. In a state in which the vehicle V is positioned on a horizontal plane, the vehicle longitudinal direction X and the vehicle width direction Y are along a horizontal direction, and the vehicle height direction Z is along a vertical direction. In the following description, regarding the vehicle longitudinal direction X, a side to which the vehicle V moves frontward may be referred to as the "front", and a side to which the vehicle V moves rearward may be referred to as the "rear". Regarding the vehicle width direction Y, the left side with respect to the front of the vehicle longitudinal direction X may be referred to as the "left side", and the right side with respect to the front of the vehicle longitudinal direction X may be referred to as the "right side". Regarding the vehicle height direction Z, an upper side in the vertical direction may be referred to as an "upper side", and a lower side in the vertical direction may be referred to as a "lower side". The directions used in the following description each represent a direction in a state in which components are assembled to each other unless otherwise specified.

Specifically, as illustrated in FIGS. 1, 2, and 3, the wire harness 1 includes the linear trunk line section 2, the distributors 3, and the middle wiring bodies 4.

The linear trunk line section 2 is a bundle of a plurality of power supply lines 21. The linear trunk line section 2 according to the present embodiment includes a plurality of communication lines 22 for signal communication bundled with the power supply lines 21. The power supply line 21 and the communication line 22 are linear wiring bodies wired in the vehicle V, and constitute part of a plurality of circuits in the wire harness 1. The linear trunk line section 2 is configured by bundling a plurality of power supply lines 21 and communication lines 22 serving as the linear wiring bodies. In this case, the linear wiring body is typically a wiring body configured to have a pair of ends, that is, it is a wiring body that is formed in a linear shape and does not have branching between the pair of ends. In other words, the linear trunk line section 2 configured by bundling the power supply lines 21 and the communication lines 22 as the linear wiring bodies is formed in a linear shape and does not have branching between the pair of ends.

The power supply lines 21 are linear conductors used for power supply to supply electric power for driving each appliance D. The power supply lines 21 according to the present embodiment include two lines in total, that is, one power line 21a for power supply and one ground line 21b for grounding. The power line 21a is, for example, a wiring body that supplies electric power of a predetermined voltage (for example, 12 V or 48 V). The ground line 21b is a wiring body for establishing what is called a ground. Each power supply line 21 may be a power supply line for a direct current or for an alternate current depending on a specification and the like required for making the lines standardized and common. The communication lines 22 are linear conductors used for signal communication to supply various signals to each appliance D. The communication lines 22 according to the present embodiment include two lines in total, that is, communication lines 22a and 22b for communication. Each of the communication lines 22a and 22b is, for example, a wiring body for implementing various communication systems (for example, for SIG+ or SIG−). In the following description, when the power line 21a and the ground line 21b are not required to be distinguished from each other, the power line 21a and the ground line 21b are simply referred to as the power supply line 21. Similarly, when the communication lines 22a and 22b are not required to be distinguished from each other, the communication lines 22a and 22b are simply referred to as the communication line 22.

Each of the power supply lines 21 and the communication lines 22 is constituted of, for example, an electric wire obtained by applying an insulating coating to a core wire configured by bundling or twisting a plurality of conductive metal wires, a metal bar obtained by applying an insulating coating to a conductive bar member, a busbar, and a plane circuit body (for example, flexible printed circuits (FPC) and a flexible flat cable (FFC)). Each of the communication lines 22 may include a cable for optical communication. The power supply lines 21 and the communication lines 22, that is, the power line 21a, the ground line 21b, and the communication lines 22a and 22b are, for example, bundled together via a common insulating coating 23 and the like to constitute the linear trunk line section 2. The linear trunk line section 2 may be configured such that the power line 21a, the ground line 21b, and the communication lines 22a and 22b to which the insulating coating is individually applied are bundled together with an exterior part such as wound tape, a corrugated tube, and a binding band. Additionally, an exterior part such as a grommet, a protector, and a fixture may be assembled to the linear trunk line section 2. The linear trunk line section 2 is wired along the vehicle longitudinal direction X.

Each of the distributors 3 distributes various types of electric power to each appliance D. The distributor 3 is typically a connection center part for each appliance D via the corresponding middle wiring body 4, and constitutes what is called a connection hub for each appliance D. The distributor 3 according to the present embodiment includes a pair of trunk line end distributors 3F and 3R connected to both ends of the linear trunk line section 2. The trunk line end distributor 3F is connected to a front end in the vehicle longitudinal direction X of the linear trunk line section 2. The trunk line end distributor 3R is connected to a rear end in the vehicle longitudinal direction X of the linear trunk line section 2. Each of the trunk line end distributors 3F and 3R includes a power supply distributor 31 and a communication distributor 32. In the following description, when the trunk line end distributors 3F and 3R are not required to be distinguished from each other, the trunk line end distributors 3F and 3R are simply referred to as the distributor 3. In the example of FIG. 2, each distributor 3 is illustrated such that the power supply distributor 31 is integrated with the communication distributor 32 to configure one box unit. However, the embodiment is not limited thereto. The power supply distributor 31 and the communication distributor 32 may be separately configured and connected to each other.

The power supply line 21 of the linear trunk line section 2 is connected to each power supply distributor 31, and the appliance D is connected via the middle wiring body 4. Each power supply distributor 31 distributes electric power that drives each appliance D to each connected appliance D from a power supply 5 to perform power supply. The power supply 5 mounted on the vehicle V is connected to at least one end of each power supply distributor 31 via the middle wiring body 4 and the like. In other words, the linear trunk line section 2 is connected to the power supply 5 via the power supply distributor 31 of the distributor 3, and electric power is supplied thereto from the power supply 5 via the power supply distributor 31 of the distributor 3. In this case, the power supply 5 mounted on the vehicle V is constituted of, for example, a power generator or a battery that generates electric power such as an alternator, and a power storage device that accumulates electric power such as a condenser, a capacitor, a secondary battery unit, and a thin sheet battery. In the example of FIGS. 1 and 2, a battery (BATT) 51 and a battery (BATT) 52 each serving as the power storage device are illustrated as the power supply 5 mounted on the vehicle V. The battery 51 is connected to the power supply distributor 31 of the trunk line end distributor 3F via the middle wiring body 4 and the like, and the battery 52 is connected to the power supply distributor 31 of the trunk line end distributor 3R via the middle wiring body 4 and the like. For example, in the following description, the battery 51 configures a main power supply 5 in the vehicle V, and the battery 52 configures a secondary power supply 5 for backup in the vehicle V. However, the embodiment is not limited thereto. At least one of power supplies 5 may be connected to any of a plurality of power supply distributors 31. It can be said that each power supply distributor 31 incorporates a function of what is called an electric connection box such as a junction block that distributes electric power supplied from the power supply 5 to each connected appliance D, a fuse box, and a relay box. Each power supply distributor 31 includes, for example, various power supply distribution functional components related to power supply distribution such as a relay, a resistor, a transistor, an intelligent power switch (IPS), and a power supply control box unitizing them, and a housing that houses the various power supply distribution functional components. Each power supply distributor 31 may include a circuit protection unit such as a fuse that protects an electric circuit of each appliance D from a large electric current equal to or larger than a rated current. Each power supply distributor 31 may include a control device such as an electronic control unit (ECU).

The communication line 22 of the linear trunk line section 2 is connected to each communication distributor 32, and the appliance D is connected thereto via the middle wiring body 4. Each communication distributor 32 distributes various signals to each of the connected appliances D to perform signal communication. Each communication distributor 32 includes, for example, various communication functional components related to signal communication such as various transmission/reception devices, and a housing that houses the various communication functional components. A communication protocol executed by each communication line 22 and each communication distributor 32 include, for example, CAN communication, CAN-FD, Ethernet (registered trademark), power line communications (PLC) or the like. However, the embodiment is not limited thereto. Each communication distributor 32 may include the control device such as the electronic control unit (ECU). Each communication distributor 32 may have a function of a communication gateway. Each distributor 32 may include an optical functional component related to optical communication as needed.

Each end of the power supply line 21 and the communication line 22 of the linear trunk line section 2 is connected to a corresponding one of the power supply distributor 31 and the communication distributor 32 via a connection part such as a connector. In other words, a connection part such as a connector arranged at one end (front end in the vehicle longitudinal direction X) of the power supply line 21 and the communication line 22 of the linear trunk line section 2 are respectively connected to the power supply distributor 31 and the communication distributor 32 of the trunk line end distributor 3F. On the other hand, a connection part such as a connector arranged at the other end (rear end in the vehicle longitudinal direction X) of the power supply line 21 and the communication line 22 of the linear trunk line section 2 are respectively connected to the power supply distributor 31 and the communication distributor 32 of the trunk line end distributor 3R. That is, the linear trunk line section 2 is connected to the trunk line end distributor 3F and the trunk line end distributor 3R via the connection part such as a connector, extends between the trunk line end distributor 3F and the trunk line end distributor 3R, and connects the pair of the trunk line end distributors 3F, 3R to each other. One end of the middle wiring body 4 is connected to a corresponding one of the power supply distributor 31 and the communication distributor 32 via a connection part such as a connector. Each of the power supply distributor 31 and the communication distributor 32 is electrically, and optically as needed, connected to the power supply line 21 and the communication line 22 of the linear trunk line section 2 and the middle wiring body 4 via the connection part such as a connector. (Hereinafter, the same description means that components are also optically connected as needed.)

The linear trunk line section 2 and the distributor 3 constitute the common trunk line 10. Typically, it is preferable that the common trunk line 10 is made standardized and common irrespective of a type of a vehicle, a platform, a grade of a vehicle, and the like to which the common trunk line 10 is applied. The common trunk line 10 configures a main power supply line unit in an electric module of the vehicle V, and is called a backbone in some cases, for example. The common trunk line 10 is arranged in the vehicle V in a positional relation such that the linear trunk line section 2 is wired along the vehicle longitudinal direction X at substantially the center in the vehicle width direction Y, the trunk line end distributor 3F is positioned at the front end in the vehicle longitudinal direction X, and the trunk line end distributor 3R is positioned at the rear end in the vehicle longitudinal direction X. For example, the trunk line end distributor 3F is positioned under a dashboard and the like on the front side in the vehicle longitudinal direction X of the vehicle V, and the trunk line end distributor 3R is positioned in the back of a rear seat and the like on the rear side in the vehicle longitudinal direction X of the vehicle V. The linear trunk line section 2 and the distributor 3 of the common trunk line 10 are arranged on one side of a metal flooring material (floor panel) FL of the vehicle V along the flooring material FL with respect to the vehicle height direction Z (vertical direction), and fixed to the flooring material FL and the like via a fixture such as various clamps and clips, for example. The flooring material FL is supported by wheels of the vehicle V via a suspension. In the example of FIG. 2, the linear trunk line section 2 and the distributor 3 are arranged on the inside of a cabin as an upper side in the vertical direction of the flooring material FL. However, the embodiment is not limited thereto. Both of the linear trunk line section 2 and the distributor 3 may be arranged under the floor (outside of a vehicle compartment) as a lower side in the vertical direction of the flooring material FL, or one of the linear trunk line section 2 and the distributor 3 may be arranged on the inside of the vehicle compartment, and the other one thereof may be arranged under the floor.

Figure 4:
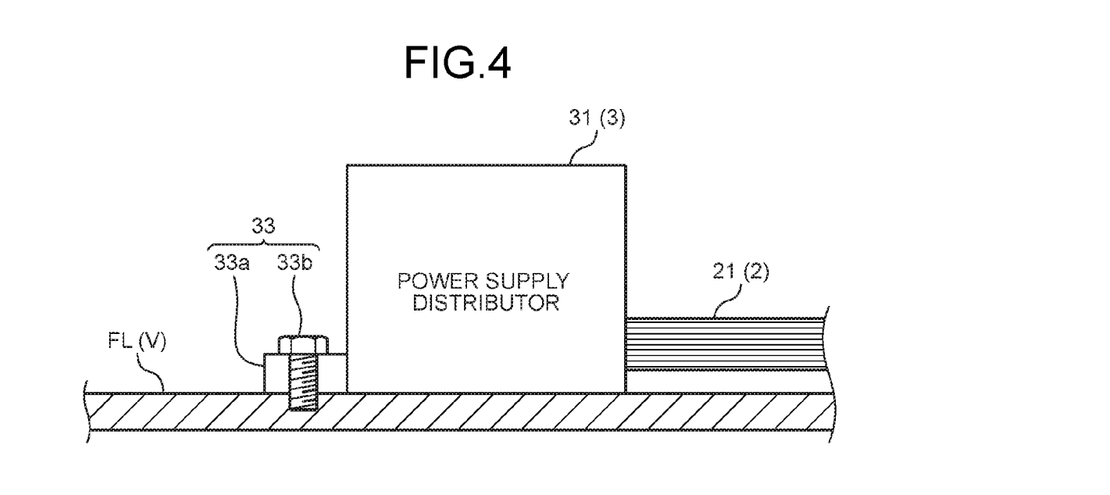
FIG. 4 is a schematic cross-sectional view illustrating a schematic configuration of fastened and grounded part of the wire harness according to the first embodiment.

As illustrated in FIG. 4, the trunk line end distributor 3F and 3R according to the present embodiment may include a fastened and grounded part 33 that is fastened to the vehicle V and grounded. For example, the fastened and grounded part 33 includes a conductive metal bracket 33a projecting from the housing of each power supply distributor 31 of the trunk line end distributors 3F and 3R, and a metal fastening member 33b such as a bolt that fastens and fixes the bracket 33a to the body of the vehicle V, for example, the metal flooring material FL. Accordingly, each of the trunk line end distributors 3F and 3R is grounded with the fastened and grounded part 33. In this case, for example, the bracket 33a is electrically connected to the ground line 21b described above, and the ground line 21b is electrically ground-connected to the flooring material FL to be grounded via the bracket 33a and the fastening member 33b constituting the fastened and grounded part 33.

Returning to FIG. 1, the middle wiring body 4 is a wiring body that is interposed between each distributor 3 and the appliance D, and between each distributor 3 and each power supply 5, and electrically connects each distributor 3 to the appliance D and each power supply 5. Similarly to the linear trunk line section 2, each middle wiring body 4 includes a power supply line such as a power line and a ground line and various communication lines in accordance with a request from the appliance D. Similarly to the linear trunk line section 2, for example, each middle wiring body 4 is constituted of an electric wire obtained by applying an insulating coating to a core wire configured by bundling or twisting a plurality of conductive metal wires, a metal bar obtained by applying an insulating coating to a conductive bar member, a busbar, a plane circuit body, and the like. Each middle wiring body 4 may include a cable for optical communication in accordance with a request from the appliance D. Similarly to the linear trunk line section 2, each middle wiring body 4 may be configured to be bundled together via a common insulating coating and the like, and for example, may be configured to be bundled together via an exterior part such as wound tape, a corrugated tube, and a binding band. Additionally, an exterior part such as a grommet, a protector, and a fixture may be assembled therewith. One end of each middle wiring body 4 is connected to the trunk line end distributor 3F, the trunk line end distributor 3R, and the like via a connection part such as a connector, and the other end thereof is connected to the appliance D, the batteries 51 and 52 constituting the power supply 5, and the like via a connection part such as a connector. That is, each middle wiring body 4 is connected to the trunk line end distributor 3F, the trunk line end distributor 3R, the appliance D, the batteries 51 and 52, and the like via a connection part such as a connector, and extends between each of the trunk line end distributor 3F, the trunk line end distributor 3R, and the like and each of the appliance D, the batteries 51 and 52, and the like to electrically connect them to each other. As the appliance D connected to each distributor 3 via the middle wiring body 4, FIG. 1 exemplifies a lamp D1, a switch D2, an ECU D3, and an actuator D4 that are connected to the trunk line end distributor 3F, and a motor D5 and a lamp D6 that are connected to the trunk line end distributor 3R. However, the embodiment is not limited thereto. A branch part may be further provided to each middle wiring body 4 connected to the appliance D, a plurality of appliances D may be connected thereto, and the whole of them may be modularized to configure a sub-module to implement a circuit with higher density and higher efficiency. To secure selection diversity, for example, a plurality of types of middle wiring bodies 4 may be prepared such that a length, a diameter, material, a shape, the number of branches, and the like of each middle wiring body 4 are made variable in accordance with a type of a vehicle, a platform, a grade of a vehicle, and the like to which the middle wiring body 4 is applied, and any one thereof may be appropriately selected to be applied.

The wire harness 1 described above includes the linear trunk line section 2 formed by bundling the power supply lines 21 serving as the linear wiring bodies wired in the vehicle V, and the pair of trunk line end distributors 3F and 3R each of which is connected to a corresponding one of both ends of the linear trunk line section 2. The power supply 5 mounted on the vehicle V is connected to at least one end of each of the trunk line end distributors 3F and 3R. The trunk line end distributors 3F and 3R distribute electric power from the power supply 5 to each connected appliance D.

Thus, with the wire harness 1, the wiring path can be simplified with a combination of the linear trunk line section 2 obtained by bundling the power supply lines 21, and the pair of trunk line end distributors 3F and 3R each of which is connected to a corresponding one of both ends of the linear trunk line section 2 and distributes electric power from the power supply 5 to each connected appliance D. More specifically, in the wire harness 1, the middle wiring bodies 4 are wired to be branched and spread around the trunk line end distributors 3F and 3R connected to each other via the linear trunk line section 2 not having branching, and the trunk line end distributors 3F and 3R are connected to the respective appliances D. Accordingly, the shape of the wire harness 1 is simplified to be a more compact and space-saving configuration, and the wiring path can be simplified. Due to this, with the wire harness 1, workability at the time of assembling can be improved, and the number of components can be reduced, so that an operation of handling or collecting various wiring bodies can be simplified, for example. That is, with the wire harness 1, the linear trunk line section 2 and the trunk line end distributors 3F and 3R, that is, the common trunk line 10 can be assembled to the vehicle V, and the wire harness 1 can be assembled to the vehicle V by connecting the trunk line end distributors 3F and 3R to the respective appliances D, so that efficiency of assembling operation can be improved, an assembling property with respect to the vehicle V can be improved, and manufacturing efficiency can be improved.

With the wire harness 1, the common trunk line 10 constituted of the linear trunk line section 2 and the pair of trunk line end distributors 3F and 3R is made standardized and common as much as possible irrespective of a type of a vehicle, a platform, a grade of a vehicle, and the like, and each middle wiring body 4 and the like connecting the common trunk line 10 to each appliance D are made variable in accordance with a type of a vehicle, a platform, a grade of a vehicle, and the like to be appropriately selected and combined. Accordingly, in addition to the simplification of the wiring path as described above, versatility can be improved due to the standardized and common member, and optimization due to selection diversity of the member can be achieved in a good balance. As a result, the wire harness 1 can have a configuration that is easily applied to various vehicles V.

In the wire harness 1 described above, the linear trunk line section 2 includes the communication line 22 for signal communication serving as a linear wiring body bundled with the power supply lines 21 and wired in the vehicle V. Thus, in the wire harness 1, the linear trunk line section 2 can be configured by bundling the power supply lines 21 with the communication line 22 together to be a trunk line, so that the wiring path can be further simplified, and wiring workability can be further improved.

In the wire harness 1 described above, the power supply lines 21 include the power line 21a for power supply and the ground line 21b for grounding. Thus, by connecting the pair of trunk line end distributors 3F and 3R via the power line 21a and the ground line 21b constituting the power supply lines 21, the wire harness 1 can perform ground-connection and power supply on each appliance D via the trunk line end distributors 3F and 3R from the batteries 51 and 52 constituting the power supply 5. In the wire harness 1, the power line 21a and the ground line 21b constituting the power supply lines 21 are bundled together to be a trunk line to configure the linear trunk line section 2, so that the wiring path can be further simplified, and wiring workability can be further improved.

Additionally, in the wire harness 1 described above, the trunk line end distributors 3F and 3R each include the fastened and grounded part 33 that is fastened to the vehicle V and grounded. Thus, the wire harness 1 can use the fastened and grounded part 33 that fastens and fixes the trunk line end distributors 3F and 3R to the vehicle V also for ground-connecting the trunk line end distributors 3F and 3R and the linear trunk line section 2 connected thereto (typically, the ground line 21b) to a metal body (flooring material FL) and the like of the vehicle V to be connected to a negative side of each of the batteries 51 and 52 constituting the power supply 5. As a result, with the wire harness 1, the number of components can be reduced, the trunk line end distributors 3F and 3R can be fastened and fixed, and ground-connected at the same time, the number of operation steps can be reduced, and an operation of handling or collecting various wiring bodies can be simplified. As a result, with the wire harness 1, assembling property with respect to the vehicle V can be further improved, and manufacturing efficiency can be further improved.

Second Embodiment

The wire harness according to a second embodiment is different from that in the first embodiment in that the trunk line end distributor is constituted of a plurality of divided bodies. In the following description, the same component as that in the above embodiment is denoted by the identical reference numeral, and redundant description about the same configuration, operation, and effect will not be repeated (the same is applied hereinafter).

Figure 5:
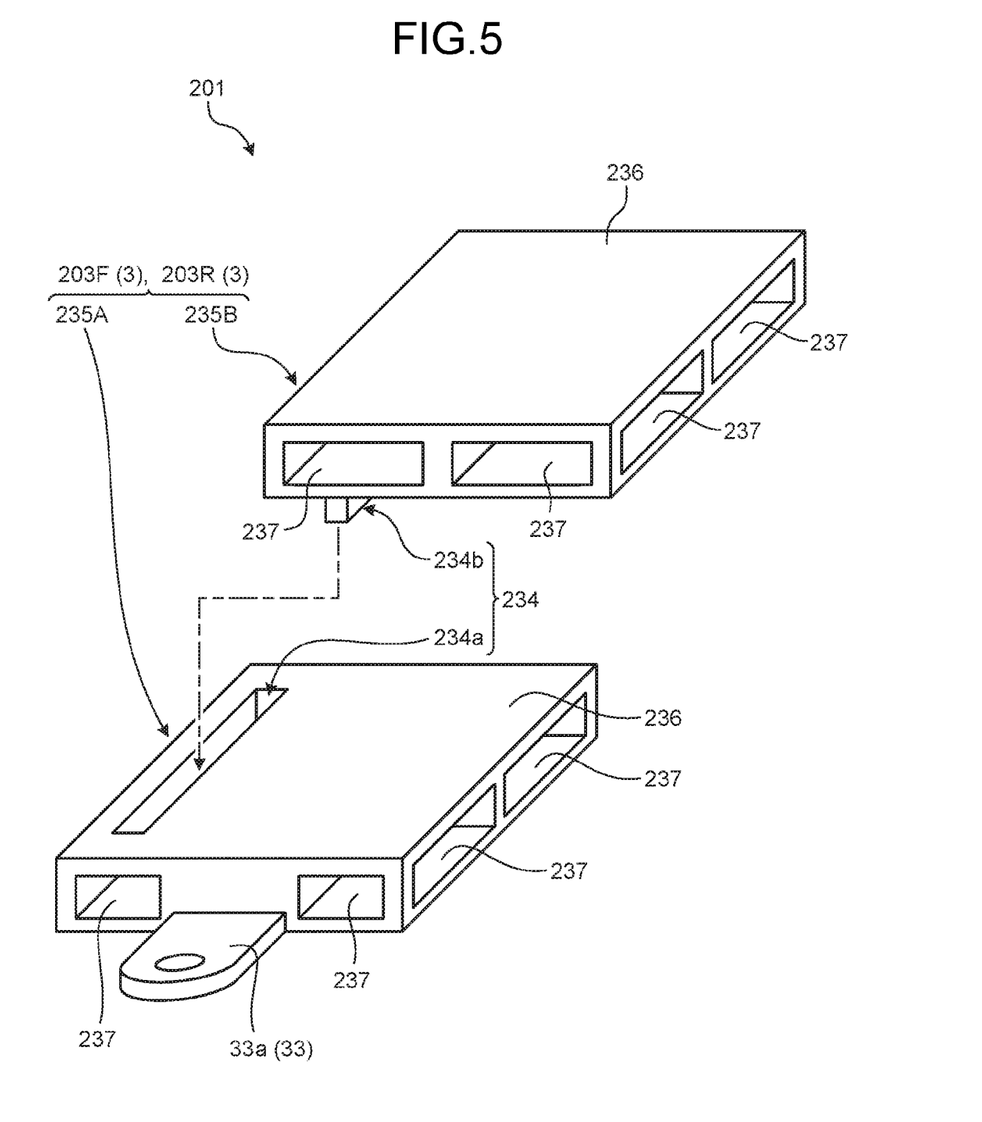
FIG. 5 is a schematic exploded perspective view illustrating a schematic configuration of a distributor of a wire harness according to a second embodiment.

A wire harness 201 according to the present embodiment illustrated in FIG. 5 is different from the wire harness 1 described above in that the wire harness 201 includes trunk line end distributors 203F and 203R in place of the trunk line end distributors 3F and 3R. Other configurations are substantially the same as those of the wire harness 1.

The trunk line end distributors 203F and 203R according to the present embodiment are different from the trunk line end distributors 3F and 3R in that the trunk line end distributors 203F and 203R each include a plurality of divided bodies 235A and 235B that can be coupled to each other via a coupling unit 234 and can be divided via the coupling unit 234. Other configurations are substantially the same as those of the trunk line end distributors 3F and 3R. Here, both of the trunk line end distributors 203F and 203R are assumed to include the divided bodies 235A and 235B. Alternatively, any one of the trunk line end distributors 203F and 203R may include the divided bodies 235A and 235B. Each of the trunk line end distributors 203F and 203R according to the present embodiment is assumed to include two divided bodies in total, that is, the divided body 235A and the divided body 235B. However, the embodiment is not limited thereto, and each of the trunk line end distributors 203F and 203R may include three or more divided bodies.

Each of the divided bodies 235A and 235B includes a housing 236 and a connection slot 237. The housing 236 houses various functional components such as various power supply distribution functional components and various communication functional components. The connection slots 237 are arranged as recessed portions on an outer face of the housing 236. A connection part such as a connector arranged at each end of the power supply line 21 and the communication line 22 constituting the linear trunk line section 2 and the middle wiring body 4 is fitted into the connection slot 237, which is a connection part that electrically connects various functional components in the housing 236 to the power supply line 21, the communication line 22, and the middle wiring body 4.

The divided body 235A further includes the bracket 33a described above and a coupling slot 234a constituting the coupling unit 234, in addition to the housing 236 and the connection slot 237. The coupling slot 234a is arranged as a recessed portion on the outer face of the housing 236, typically, relatively the largest face, and configures the coupling unit 234 by which the divided body 235A and the divided body 235B can be coupled to each other, and the divided body 235A and the divided body 235B can be divided from each other. On the other hand, the divided body 235B further includes a coupling insertion part 234b constituting the coupling unit 234 in addition to the housing 236 and the connection slot 237. The coupling insertion part 234b is arranged as a projecting portion on the outer face of the housing 236, typically, relatively the largest face, and configures the coupling unit 234 together with the coupling slot 234a.

The coupling insertion part 234b is inserted and fitted into the coupling slot 234a so that the coupling unit 234 couples the divided body 235A and the divided body 235B to each other to be integrated to configure the trunk line end distributors 203F and 203R, and the coupling unit 234 electrically connects various functional components and the like of the divided body 235A and the divided body 235B to each other. When the coupling insertion part 234b is extracted from the coupling slot 234a, the coupling unit 234 divides the divided body 235A and the divided body 235B from each other to be separated, and releases electrical connection between the various functional components and the like of the divided body 235A and the divided body 235B. In this case, the coupling slot 234a of the coupling unit 234 is arranged on the divided body 235A and the coupling insertion part 234b thereof is arranged on the divided body 235B. However, the embodiment is not limited thereto. The coupling slot 234a may be arranged on the divided body 235B, and the coupling insertion part 234b may be arranged on the divided body 235A. Alternatively, another form of coupling structure may be employed.

Figure 6:
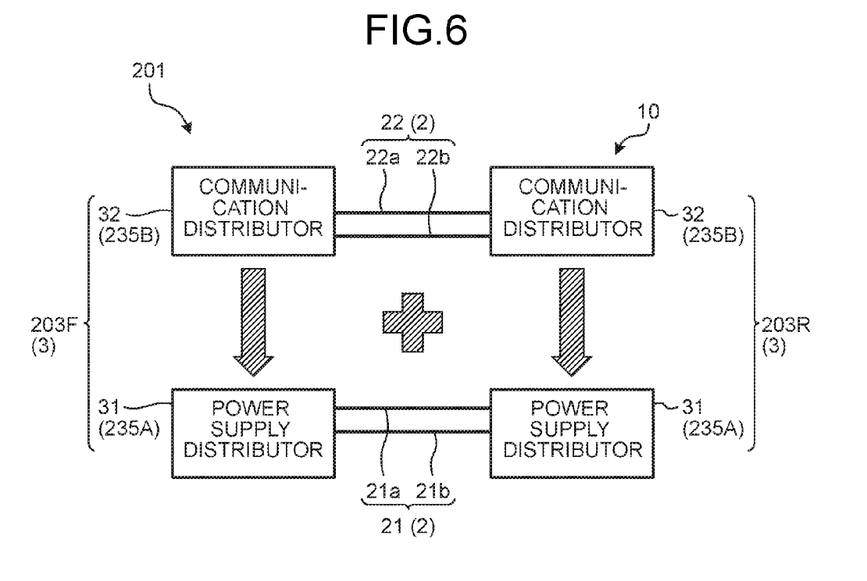
FIG. 6 is a schematic block diagram for explaining a combination of a plurality of divided bodies of the distributor of the wire harness according to the second embodiment.

In each of the trunk line end distributors 203F and 203R, for example, as illustrated in FIG. 6, the divided body 235A may configure the power supply distributor 31, and the divided body 235B may configure the communication distributor 32. That is, in each of the trunk line end distributors 203F and 203R, the power supply distributor 31 configured as the divided body 235A and the communication distributor 32 configured as the divided body 235B may be integrated with each other via the coupling unit 234 to configure one box unit. In this case, in the linear trunk line section 2, the power supply line 21 including the power line 21a and the ground line 21b is connected to the power supply distributor 31 configured as the divided body 235A, and the communication line 22 including the communication lines 22a and 22b is connected to the communication distributor 32 configured as the divided body 235B.

In each of the trunk line end distributors 203F and 203R, for example, the divided body 235A may configure a basic box that is made standardized and common irrespective of a type of a vehicle, a platform, a grade of a vehicle, and the like, and the divided body 235B may configure an expansion box that is appropriately selected or added/expanded in accordance with a type of a vehicle, a platform, a grade of a vehicle, and the like. In each trunk line end distributors 203F and 203R, any one or both of the power supply distributor 31 and the communication distributor 32 may be configured to be dividable into the divided bodies 235A and 235B.

Figure 7:
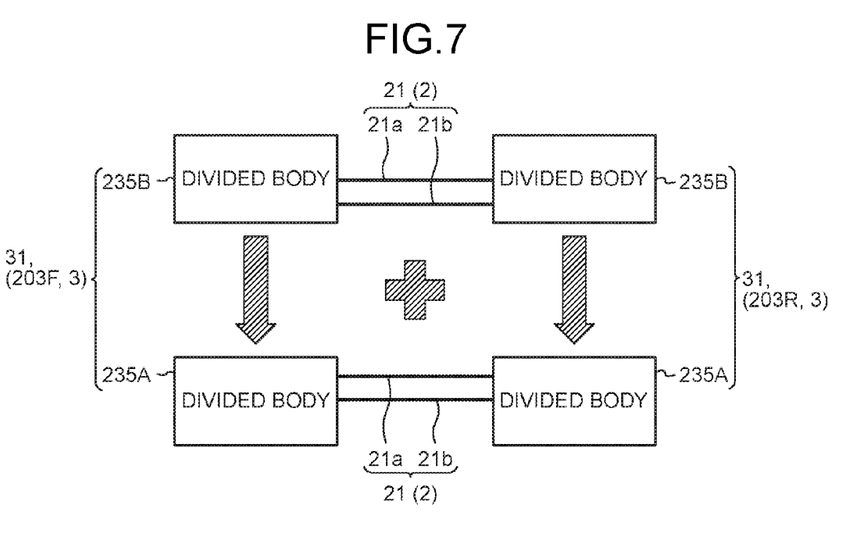
FIG. 7 is a schematic block diagram for explaining a combination of a plurality of divided bodies of the distributor of the wire harness according to the second embodiment.

For example, as exemplified in FIG. 7, in each of the trunk line end distributors 203F and 203R, the power supply distributor 31 may be configured to be dividable into the divided body 235A and the divided body 235B. The divided body 235A configures a basic box of each power supply distributor 31, and the divided body 235B configures an expansion box of each power supply distributor 31. In each power supply distributor 31, the basic box configured as the divided body 235A and the expansion box configured as the divided body 235B may be integrated with each other via the coupling unit 234 to configure one box unit. In this case, in each power supply distributor 31, a power supply system of the basic box configured as the divided body 235A and a power supply system of the expansion box configured as the divided body 235B may be independent of each other. In this case, in the linear trunk line section 2, two systems of the power supply line 21 including the power line 21a and the ground line 21b are arranged, and each of the two systems may be connected to the basic box configured as the divided body 235A and the expansion box configured as the divided body 235B. In this case, in each power supply distributor 31, for example, the power supply system of the basic box configured as the divided body 235A and the power supply system of the expansion box configured as the divided body 235B may be caused to be different systems at the same voltage, and the appliance D related to a safety system and the like and the appliance D related to a multimedia system and the like may be caused to be different power supply systems, the appliance D related to the safety system and the like being connected to the basic box configured as the divided body 235A and required to have relatively high reliability, and the appliance D related to the multimedia system and the like being connected to the expansion box configured as the divided body 235B and allowed to have reliability relatively lower than that of the safety system. In each power supply distributor 31, for example, a low voltage power supply system the voltage of which is set to be relatively low (for example, 12 V) may be configured with the basic box configured as the divided body 235A, and a high voltage power supply system the voltage of which is set to be relatively high (for example, 48 V) may be configured with the expansion box configured as the divided body 235B. In the wire harness 201, for example, the coupling slot 234a can be increased without increasing the systems by causing the power supply line 21 to be one system connected to the divided body 235A and increasing the divided body 235B instead of arranging two systems of the power supply line 21 as described above.

With the wire harness 201 described above, the wiring path can be simplified by combining the linear trunk line section 2 obtained by bundling the power supply lines 21 and the pair of trunk line end distributors 203F and 203R each of which is connected to a corresponding one of both ends of the linear trunk line section 2 and distributes electric power from the power supply 5 to each connected appliance D.

In the wire harness 201 described above, each of the trunk line end distributors 203F and 203R includes the divided bodies 235A and 235B that can be coupled to each other via the coupling unit 234 and can be divided from each other via the coupling unit 234. Accordingly, the wire harness 201 can improve expandability, and can also improve versatility.

Third Embodiment

A wire harness according to a third embodiment is different from that in the first embodiment in the configuration of the linear trunk line section.

Figure 8:
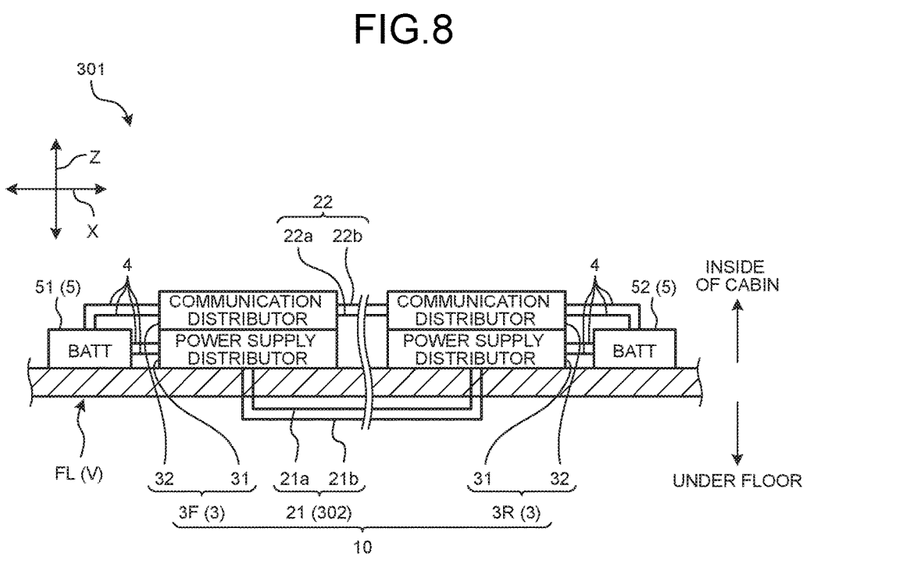
FIG. 8 is a schematic block diagram illustrating a schematic configuration of a wire harness according to a third embodiment.
Figure 9:
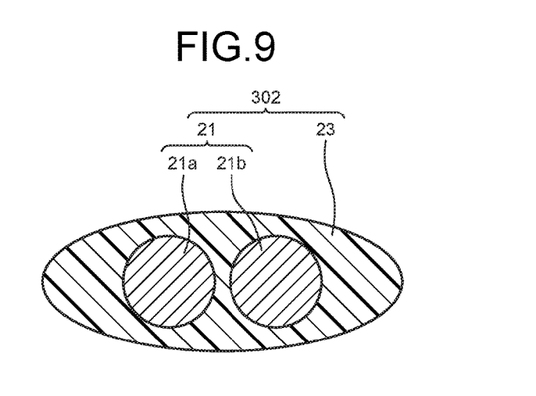
FIG. 9 is a schematic cross-sectional view illustrating a schematic configuration of a linear trunk line section of the wire harness according to the third embodiment.

A wire harness 301 according to the present embodiment illustrated in FIGS. 8 and 9 is different from the wire harness 1 described above in that the wire harness 301 includes a linear trunk line section 302 in place of the linear trunk line section 2. Other configurations are substantially the same as those of the wire harness 1.

As exemplified in FIGS. 8 and 9, the linear trunk line section 302 according to the present embodiment is different from the linear trunk line section 2 described above in that the linear trunk line section 302 is configured by bundling a plurality of power supply lines 21 including the power line 21a and the ground line 21b without including the communication line 22 described above. Other configurations are substantially the same as those of the linear trunk line section 2. That is, the linear trunk line section 302 according to the present embodiment includes two power supply lines 21 including the power line 21a and the ground line 21b, and the insulating coating 23. The linear trunk line section 302 configures the common trunk line 10 together with the trunk line end distributors 3F and 3R (distributors 3). The communication line 22 (communication lines 22a and 22b) according to the present embodiment is configured as a linear wiring body wired in the vehicle V separately from the linear trunk line section 302.

The linear trunk line section 302 according to the present embodiment is wired on one side of the metal flooring material FL of the vehicle V with respect to the vertical direction, and the communication line 22 is wired on the other side of the flooring material FL with respect to the vertical direction. In the example of FIG. 8, the linear trunk line section 302 of the common trunk line 10 is wired under the floor as a lower side in the vertical direction of the flooring material FL, the trunk line end distributors 3F and 3R (distributors 3) are arranged on the inside of the cabin as an upper side in the vertical direction of the flooring material FL, and the communication line 22 is wired on the inside of the cabin as an upper side in the vertical direction of the flooring material FL. In the common trunk line 10, each power supply distributor 31 of the trunk line end distributors 3F and 3R may be arranged under the floor as a lower side in the vertical direction of the flooring material FL together with the linear trunk line section 302, and each communication distributor 32 of the trunk line end distributors 3F and 3R may be arranged on the inside of the vehicle compartment as an upper side in the vertical direction of the flooring material FL together with the communication line 22.

With the wire harness 301 described above, the wiring path can be simplified by combining the linear trunk line section 302 obtained by bundling the power supply lines 21 and the pair of trunk line end distributors 3F and 3R each of which is connected to a corresponding one of both ends of the linear trunk line section 302 and distributes electric power from the power supply 5 to each connected appliance D.

The wire harness 301 described above includes the communication line 22 for signal communication serving as a linear wiring body wired in the vehicle V separately from the linear trunk line section 302. The linear trunk line section 302 is wired on one side of the metal flooring material FL of the vehicle V with respect to the vertical direction, and the communication line 22 is wired on the other side of the flooring material FL with respect to the vertical direction. Thus, in the wire harness 301, the communication line 22 is wired on the opposite side of the linear trunk line section 302 including the power supply line 21 across the metal flooring material FL, so that the metal flooring material FL can be caused to function as a shielding plate (shielding member), which can reduce influence of electromagnetic noise in the communication line 22.

The wire harness according to the embodiments of the present invention described above is not limited to the embodiments, and can be variously modified without departing from the scope of the invention. The wire harness according to the present embodiment may be configured by appropriately combining components in the embodiments described above and modifications.

According to the above description, the trunk line end distributors 3F, 3R, 203F, and 203R and the linear trunk line sections 2 and 302 connected thereto may be ground-connected to the metal body (flooring material FL) and the like of the vehicle V to be connected to the negative side of the batteries 51 and 52 constituting the power supply 5 via an electric wire for grounding extending from the trunk line end distributors 3F, 3R, 203F, and 203R without using the fastened and grounded part 33 described above.

In the above description, the linear trunk line section 2 includes the communication line 22 for signal communication bundled with the power supply lines 21. However, the linear trunk line section 2 does not necessarily include the communication line 22 like the linear trunk line section 302 illustrated in FIGS. 8 and 9, and the trunk line end distributors 3F, 3R, 203F, and 203R do not necessarily include the communication distributor 32. The wire harnesses 1, 201, and 301 may implement communication between the trunk line end distributors 3F and 203F and the trunk line end distributors 3R and 203R through wireless communication of various systems such as near field radio communication (NFC) including W-LAN, Wi-Fi (registered trademark), and Bluetooth (registered trademark), for example, without using wired communication via the communication line 22.

In this case, each communication distributor 32 may include a wireless communication functional component such as a transmission/reception unit of various systems and an antenna. The communication line may be shared by the power supply line 21 to be used in the power line communications (PLC) described above.

In the above description, the power supply lines 21 are linear conductors used for power supply, and each include two lines in total, that is, one power line 21a for power supply and one ground line 21b for grounding. However, the embodiment is not limited thereto. For example, the ground line may be arranged separately from the power supply line 21 of the linear trunk line sections 2 and 302, or a plurality of power lines 21a may be arranged.

With the wire harness according to the present invention, the wiring path can be simplified by combining the linear trunk line section obtained by bundling a plurality of power supply lines and a pair of trunk line end distributors each of which is connected to a corresponding one of both ends of the linear trunk line section and distributes electric power from the power supply to each connected appliance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wire harness comprising:
   a linear trunk line section formed by bundling a plurality of power supply lines as linear wiring bodies wired in a vehicle;
   a pair of trunk line end distributors, wherein a first trunk line end distributor is connected to a first end of the linear trunk line section, and a second trunk line end distributor is connected to a second end of the linear trunk line section; and
   a pair of power supplies, wherein a first power supply is connected to the first trunk line end distributor, and a second power supply is connected to the second trunk line end distributor,
   wherein each trunk line end distributor distributes electric power from one of the power supplies to connected appliances.

2. The wire harness according to claim 1, wherein the linear trunk line section includes a communication line for signal communication serving as a linear wiring body bundled with the power supply lines and wired in the vehicle.

3. The wire harness according to claim 2, wherein the power supply lines include a power line for power supply and a ground line for grounding.

4. The wire harness according to claim 2, wherein the trunk line end distributors each include a plurality of divided bodies that are able to be coupled to each other via a coupling unit and are able to be divided from each other via the coupling unit.

5. The wire harness according to claim 1, wherein the power supply lines include a power line for power supply and a ground line for grounding.

6. The wire harness according to claim 5, wherein the trunk line end distributors each include a fastened and grounded part that is fastened to the vehicle and grounded.

7. The wire harness according to claim 5, wherein the trunk line end distributors each include a plurality of divided bodies that are able to be coupled to each other via a coupling unit and are able to be divided from each other via the coupling unit.

8. The wire harness according to claim 1, wherein the trunk line end distributors each include a fastened and grounded part that is fastened to the vehicle and grounded.

9. The wire harness according to claim 8, wherein the trunk line end distributors each include a plurality of divided bodies that are able to be coupled to each other via a coupling unit and are able to be divided from each other via the coupling unit.

10. The wire harness according to claim 1, wherein the trunk line end distributors each include a plurality of divided bodies that are able to be coupled to each other via a coupling unit and are able to be divided from each other via the coupling unit.

11. The wire harness according to claim 1, further comprising a communication line for signal communication serving as a linear wiring body wired in a vehicle separately from the linear trunk line section, wherein
the linear trunk line section is wired on one side of a metal flooring material of the vehicle with respect to a vertical direction, and
the communication line is wired on another side of the flooring material with respect to the vertical direction.

12. The wire harness according to claim 1, wherein
the trunk line end distributors include a plurality of divided bodies that are able to be coupled to each other via a coupling unit and are able to be divided from each other via the coupling unit,
one divided body of the plurality of divided bodies is a first box configured to distribute electric power from the power supply to each connected appliance, and
another divided body of the plurality of divided bodies is a second box configured to distribute electric power from the power supply to each connected appliance.

13. The wire harness according to claim 12, wherein
a power supply system of the first box and a power supply system of the second box are independent of each other,
an appliance related to a safety system of the vehicle is connected to the first box, and
an appliance other than the appliance related to the safety system is connected to the second box.

14. A wire harness comprising:
a linear trunk line section formed by bundling a plurality of power supply lines as linear wiring bodies wired in a vehicle;
a pair of trunk line end distributors, each of which is connected to a corresponding one of both ends of the linear trunk line section and distributes electric power from a power supply mounted on the vehicle, each power supply being connected to at least one end of each of the trunk line end distributors; and
a communication line for signal communication serving as a linear wiring body wired in the vehicle separately from the linear trunk line section, wherein
the linear trunk line section is wired on one side of a metal flooring material of the vehicle with respect to a vertical direction, and
the communication line is wired on another side of the flooring material with respect to the vertical direction.

15. The wire harness according to claim 14, wherein
the power supply lines include a power line for power supply and a ground line for grounding.

16. The wire harness according to claim 2, wherein
the trunk line end distributors each include a fastened and grounded part that is fastened to the vehicle and grounded.

17. The wire harness according to claim 14, wherein
the trunk line end distributors each include a fastened and grounded part that is fastened to the vehicle and grounded.

18. The wire harness according to claim 14, wherein
the trunk line end distributors each include a plurality of divided bodies that are able to be coupled to each other via a coupling unit and are able to be divided from each other via the coupling unit.

* * * * *